United States Patent [19]

Meier et al.

[11] Patent Number: 5,141,731
[45] Date of Patent: Aug. 25, 1992

[54] PROCESS FOR THE GENERATION OF PEROXYACIDS

[75] Inventors: Juergen Meier, Ridgewood; Gerhard Arnold, Ringwood, both of N.J.; Ron Choiniere, Mobile, Ala.; Uwe Wagenknecht, Mobile, Ala.; Paul Reynolds, Mobile, Ala.; Walter Harper, Bayou la Batre, Ala.

[73] Assignee: Degussa Aktiengesellschaft, Frankfurt am Main, Fed. Rep. of Germany

[21] Appl. No.: 704,530

[22] Filed: May 24, 1991

[51] Int. Cl.⁵ ............................................. C01B 17/98
[52] U.S. Cl. ................................. 423/521; 422/109; 422/189; 423/659; 562/1; 562/6

[58] Field of Search .............. 423/521, 659; 562/1, 562/6

[56] References Cited

U.S. PATENT DOCUMENTS 2,926,998  3/1960  D'Addieco et al. ............... 423/521
3,939,072  2/1976  LaForte .............................. 210/104

Primary Examiner—Wayne Langel
Attorney, Agent, or Firm—Beveridge, DeGrandi & Weilacher

[57] ABSTRACT

A process and an apparatus are described for the production of peroxyacids from concentrated solutions of hydrogen peroxide and an oxyacid. The total amount of concentrated hydrogen peroxide is divided into at least two portions which are added separately in series to the concentrated oxyacid.

20 Claims, 1 Drawing Sheet

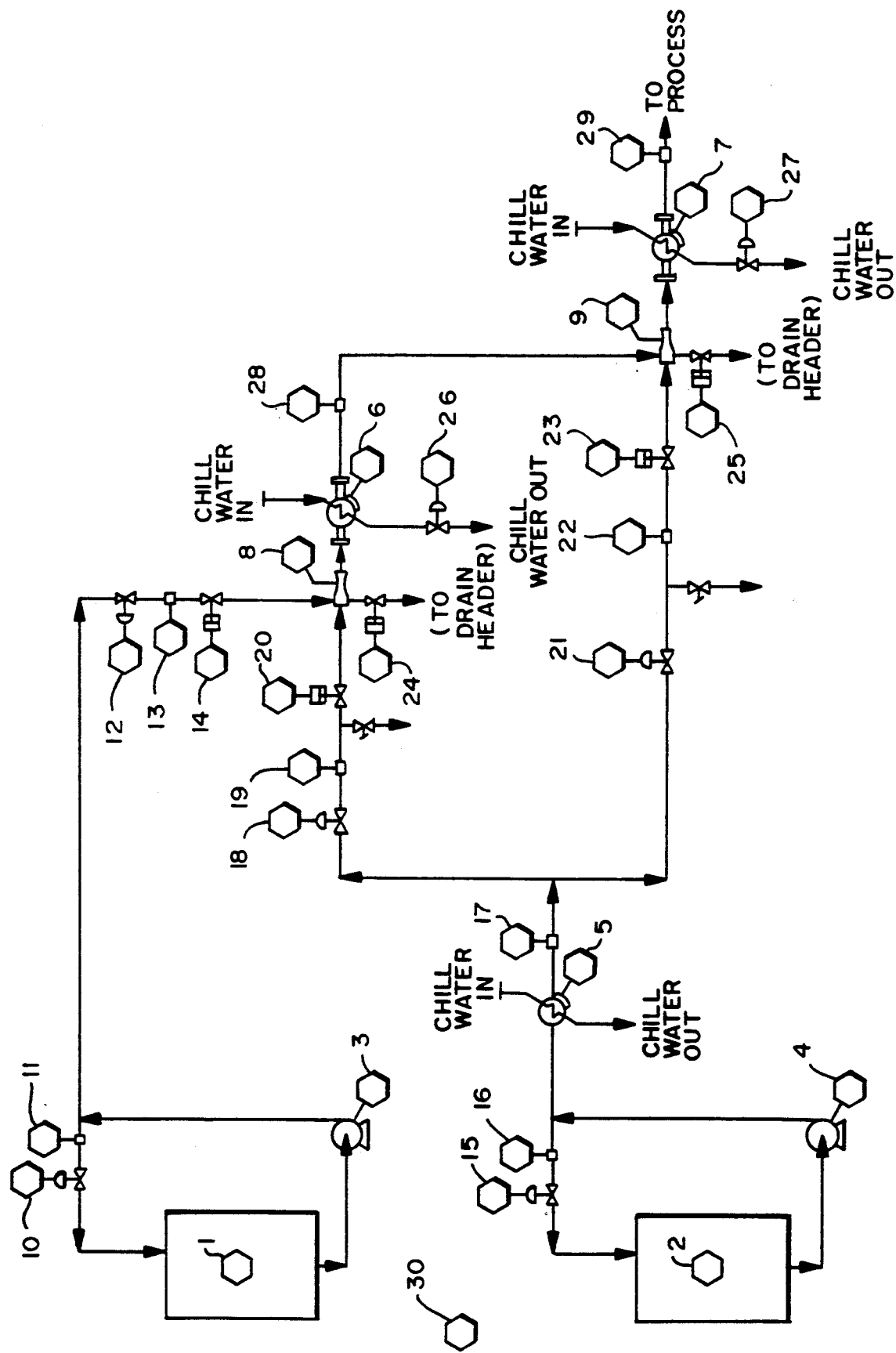

PROCESS FOR THE GENERATION OF PEROXYACIDS

BACKGROUND OF THE INVENTION

The present invention relates to a process and an apparatus for generating peroxyacids. More particularly it relates to a process and an apparatus for generating peroxomonosulfuric acid.

It is known that peroxomonosulfuric acid (Caro's acid) is a highly reactive oxidizer able to oxidize compounds, such as phenols, complex cyanides and lignin, which cannot or only to a lesser degree be oxidized by hydrogen peroxide. However, in most commercial applications a triple salt of potassium peroxomonosulfate is utilized. The peroxomonosulfate has the advantage over peroxomonosulfuric acid in that it loses very little active oxygen during storage, and is much easier and safer to handle. On the other hand, many applications of peroxomonosulfate are limited by the high price of peroxomonosulfate owing to the neutralization and drying costs involved in the production of the salt.

Consequently, generation of Caro's acid on-site instantaneously at the moment of use has been developed (as described by E. Jourdan LaForte in U.S. Pat. No. 3,939,072). On-site generation of Caro's acid can be carried out as it is needed or in situ, and thus bypasses the disadvantage of its low storage stability. In the process as described in U.S. Pat. No. 3,939,072, concentrated $H_2SO_4$ and concentrated $H_2O_2$ are added simultaneously at a molar ratio which produces peroxomonosulfuric acid most economically. The economical molar ratio for that system is about 2 moles $H_2SO_4$: 1 mole $H_2O_2$. The yield (i.e., the amount of active oxygen (AO) in percent which has been transferred from $H_2O_2$ to $H_2SO_4$ forming $H_2SO_5$) is limited in such a process which simply mixes the reagents together at once. The maximum theoretical yield obtainable with such a conventional process is less than 75% at a molar ratio of $H_2SO_4$: $H_2O_2$ being less than or equal to about 2:1.

The chemical reaction which takes place when concentrated $H_2SO_4$ and concentrated $H_2O_2$ are mixed together is described by the equation below:

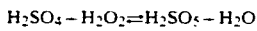

$$H_2SO_4 + H_2O_2 \rightleftharpoons H_2SO_5 + H_2O$$

The peroxomonosulfuric acid being formed is in chemical equilibrium with $H_2O_2$ and $H_2SO_4$. Thus, increasing the concentration of $H_2O_2$ and/or $H_2SO_4$ will yield more Caro's acid ($H_2SO_5$). On the other hand, the more water that is in the system, the more $H_2SO_5$ is hydrolyzed back to $H_2SO_4$ and $H_2O_2$. Since concentrated sulfuric acid is a very strong dehydrating agent, it is more favorable to add excess $H_2SO_4$ so that the $H_2O$ formed is "fixed" in the hydrate of sulfuric acid. However, use of large amounts of sulfuric acid becomes uneconomical because the neutralization costs increase in excess of the increase in yield of peroxomonosulfuric acid. In addition, the higher the $H_2SO_4$ load, the greater is the salt load in the effluent after the treatment process. As a result, the process as described in U.S. Pat. No. 3,939,072 is limited in its efficiency.

There is a long felt desire in the industry to economically increase the yield of $H_2SO_5$, while at the same time not burdening the environment (i.e., receiving waters) with higher salt loads.

Surprisingly, we have found a process and an apparatus to produce peroxomonosulfuric acid with a yield clearly and unexpectedly exceeding that of conventional processes performed at similar concentrations of the oxyacid and hydrogen peroxide and similar molar ratios of oxyacid to hydrogen peroxide. In addition to the production of peroxomonosulfuric acid and the salts thereof, the present invention can be applied to produce other inorganic and organic peroxyacids, such as peracetic acid and performic acid, among others (e.g., perpropionic acid).

SUMMARY OF THE INVENTION

One object of the present invention is to provide a process for the production of a peroxyacid solution comprising treating a concentrated oxyacid sequentially with portions of concentrated hydrogen peroxide in a plurality of reaction stages, while maintaining the temperature of the treatment below about 100° C.; the reaction state comprising adding to the oxyacid a portion of the total amount of hydrogen peroxide to be added for the treatment and mixing said portion with the oxyacid.

The process is preferably operated in a continuous fashion wherein the total amount of concentrated hydrogen peroxide is divided into at least two portions which are added in separate reaction stages in series to the oxyacid. Preferably two to four reaction stages are employed.

In a further aspect, the present invention provides an apparatus for the production of a peroxyacid comprising means for conveying a stream of concentrated oxyacid; a plurality of means for feeding hydrogen peroxide respectively into a plurality of reaction means arranged in series connecting to the means for conveying the oxyacid, whereby the peroxide and oxyacid react together to produce the product peroxyacid; and cooling means to maintain the temperature below about 100° C.

Preferred features of the apparatus include conduits for conveying the oxyacid and for feeding the peroxide into mixer reactors. Preferably two to four mixer reactors are employed, and at least one heat exchanger is associated with at least one reactor. It is preferred that the apparatus is arranged so as to permit continuous operation of the process.

Additionally, the plurality of streams of hydrogen peroxide are conveniently provided by splitting a single stream of peroxide.

DESCRIPTION OF THE DRAWING

FIG. 1 is a schematic representation of the apparatus of the present invention, the individual components of which are known in the art.

DETAILED DESCRIPTION OF THE INVENTION

In continuous operation of the apparatus, intense mixing of the reagents with each other is performed in mixing equipment (e.g., static mixers) connected in series. The continuous process can be carried out in a tube reactor (e.g., static mixers, turbulators) which is an arrangement of at least two mixing units connected in series.

Cooling jackets around the static mixers and following tube reactors (e.g., heat exchanger) allow the reaction temperature to be controlled below 100° C. (the reaction temperature depends on the ratio of the components in the mixture), and preferably between about 0° and 80° C. The reagents are metered proportionally at the rate the peroxyacid is required. The flow ratio between oxyacid and $H_2O_2$ can be set independently, and is determined by economic or ecological considerations, by inherent process properties, or by any combination of the above criteria. The reagent flow can be driven proportionally by any suitable process signal, e.g., stock flow (e.g., in pulp bleaching), etc.

The sulfuric acid is added at a temperature of about 15° C. to about 40° C., preferably above about 15° C., and at a concentration between about 96%–100% $H_2SO_4$.

The concentration of hydrogen peroxide can be 50%–80%, preferably 60%–75% solution, and preferably precooled down to −40° C.

According to U.S. Pat. No. 3,939,072 of E. Jourdan LaForte, at page 3 line 1, stainless steel is an acceptable material of construction for use with the peroxyacid. However, we have found that test coupons of stainless steel indicated a high rate of corrosion with the peroxyacid in our invention. Therefore, other materials of construction are required.

The material of construction at the injection point is particularly critical. Suitable materials for use at this point are tantalum, Teflon (tetrafluoroethylene) or glass, preferably tantalum. Materials such as Hastelloy C, Teflon, glass or tantalum are acceptable as materials of construction for the equipment (e.g., pipes, pumps and storage vessels) of the peroxyacid solution.

For a better understanding of the present invention, and to illustrate how the same may be carried into effect, reference will now be made by way of example to the accompanying drawing (FIG. 1).

Hydrogen peroxide and oxyacid are metered continuously at flow rates that are determined to be the most economical ratio and which provide the highest yield. Tank 1 contains $H_2SO_4$ and tank 2 contains $H_2O_2$. The two reactants are suitably supplied to the reactor by several methods. The two most common are the use of centrifugal pumps (3 and 4) with control valves (18, 21, 12) to regulate the flow of each reagent, or a positive displacement pump with vari-speed drive to regulate the speed of the motor and thus the feed of each raw material. The flow rate of each raw material is monitored by either a mass flow meter, magnetic flow meter or rotameter (13, 17, 19, 22). A control signal from the meter is sent to a controller (30) in order to maintain a constant ratio of raw materials; the controller regulates the chemical flows and pressures and performs emergency shut downs. This method is used to feed the multiple injection points of $H_2O_2$ into the oxyacid and peroxyacid solutions. Control value 10 and flow meter 11 allow $H_2SO_4$ to flow back to tank 1, control value 15 and flow meter 16 allow $H_2O_2$ to flow back to tank 2. Control valve 26 allows product to be removed after the first addition of $H_2O_2$.

The hydrogen peroxide is precooled using chilled water to a temperature between about −40° C. and 25° C. with the heat exchanger (5) which can be shell tube, coil or plate and frame.

Materials of construction to this point can be whatever is compatible with the raw materials. For hydrogen peroxide, stainless steel (grades 304, 316, 304L and 316L), high purity aluminum, PVC and Teflon lined are acceptable. For the sulfuric acid, stainless steel (grades 304, 316, 304L and 316L), alloy 20, carbon steel and Teflon lined are acceptable, Teflon lined is preferred.

The peroxide is added in at least two stages to the sulfuric acid in such a way as to allow for instantaneous mixing of $H_2O_2$ with $H_2SO_4$, and $H_2O_2$ with the $H_2SO_4/H_2SO_5$ mixture in the ejector/mixer (8 and 9 respectively). During and after each mixing the mixture is cooled in another heat exchanger (6, 7). These exchangers can be of shell and tube, coil or plate and frame design. The exchanger is equipped with a temperature controller (27, 28) in order to maintain a constant discharge temperature for the product of below 80° C. After exiting the heat exchanger the product can be fed directly to the point of application via flow meter 29.

Fail open drain valve (24, 25) allows the entire system to drain should it be shut down either accidentally or intentionally. This prevents the reaction product from remaining in the system after shutdown. It is also another method of preventing either raw material from getting into the other's feed system. Fail open drain valve 14 allows the $H_2SO_4$ to be drained. Fail open drain valves 20 and 23 allows the $H_2O_2$ to be drained.

The meters (13, 19, 22) or a flow switch can be utilized on each feed stream to indicate that a negative flow situation is occurring. This would automatically shut the system down.

The generator is designed so that the reactors are protected against destruction due to pressure build-up caused by decomposition of peroxygens. This is accomplished by maintaining an open system on the discharge of the generator.

Better results are obtained with a greater number of reaction stages. Because of economic reasons, two to four reactor stages will be sufficient to increase the yield clearly above that of conventional single stage reactor processes.

While the total amount of oxyacid and hydrogen peroxide required is the same as in a single-stage reactor, the multi-stage reactor or sequential addition leads to an increased yield at the same reaction time (81% compared to 70% with conventional single stage).

Preferred embodiments of the invention are illustrated by way of the following examples.

EXAMPLES

Examples 1–3

Three experiments were carried out using $H_2O_2$ (70% w/w) and $H_2SO_4$ (96%). The reactions were conducted in 250 ml beakers which were placed in an ice bath. In each experiment 204.4 g of conc. sulfuric acid (96%) were poured into the beaker. A magnetic stirrer assured intense agitation of the solution. In each experiment the same total amount of conc. $H_2O_2$ (70%) was applied. While in the first experiment the conventional process was simulated, adding the entire amount of $H_2O_2$ within two seconds, the other two experiments were conducted according to the multi-stage process of the present invention. In one case the $H_2O_2$ amount was split into two equal portions. After the first portion was added to the sulfuric acid within 2 seconds, the second portion was added 5 seconds later within 2 seconds again. In the third case the total $H_2O_2$ was split into three equal portions, each portion being added in a five second interval. In order to determine the concentration of $H_2SO_5$ and $H_2O_2$ in the final product the concentrated solutions were diluted with deionized water to a concentration of $H_2SO_5$ being less than 200 g/l and cooled. $H_2SO_5$ and $H_2O_2$ were determined by titrating first the total active oxygen concentration iodometrically ($H_2SO_5 + H_2O_2$). Then, a separate manganometric titration was performed in order to determine the $H_2O_2$ content. The concentration of $H_2SO_5$ could then be back calculated by subtracting the active oxygen content in the form of $H_2O_2$ from the total active oxygen content. Knowing the concentration of $H_2SO_5$, the residual $H_2SO_4$ can be calculated. In order to determine the chemical concentrations in the intermediate stages, additional trials were run identical to the double-stage and triple-stage reactor except that the reaction solutions were diluted after the first or third stage. The results are listed in table 1.

Three experiments were carried out using $H_2O_2$ (70% w/w) and $H_2SO_4$ (98%):

EXAMPLE 4

Example 4 simulates a conventional process (U.S. Pat. No. 3,939,072) adding the entire amount of $H_2O_2$ at one injection point. Hydrogen peroxide (70%) was added to the sulfuric acid (98%) and mixed using an ejector/mixer (8). The mixture was cooled in a heat exchanger (6). Sulfuric acid and hydrogen peroxide were added together at a molar ratio of 2:1 at a production rate of 30 gal/hr $H_2SO_5$. By using conventional technology, the yield of $H_2SO_5$ was 70.1%.

EXAMPLE 5

In test work performed with the apparatus described herein, 5 tons/day of $H_2SO_5$ (100%) was produced. At this production rate an $H_2SO_5$ yield of 81% could be achieved.

Hydrogen peroxide (70%) was added in two equal portions to the sulfuric acid (98%). The first $H_2O_2$ addition point was the same as in Example 4 but in Example 5 just half the total $H_2O_2$ amount was added. The second half of $H_2O_2$ was added to the $H_2SO_4/H_2O_2/H_2SO_5$ mixture and mixed in ejector/mixer (9) and cooled in heat exchanger (7). The production rate was 30 gal/hr of $H_2SO_5$ and the molar ratio of $H_2SO_4:H_2O_2$ was 2:1 (after the second $H_2O_2$ addition). By splitting the total $H_2O_2$ amount into two equal portions, an $H_2SO_5$ yield of 75.4% was obtained.

EXAMPLE 6

Hydrogen peroxide (70%) was added in three equal portions to the sulfuric acid (98%). Two-thirds of the total $H_2O_2$ amount was added as described in Example 5. Prior to a third ejector/mixer the third portion of $H_2O_2$ was added and then subsequently cooled in a third heat exchanger. The $H_2SO_5$ production rate and $H_2SO_4:H_2O_2$ molar ratio was the same as in Examples 4 and 5. By adding the total $H_2O_2$ amount in three equal portions at three different addition points an $H_2SO_5$ yield of 81.6% could be achieved.

$H_2SO_5$ and $H_2O_2$ were determined by titrating first the total active oxygen concentration iodometrically ($H_2SO_5 + H_2O_2$). Then, a separate manganometric titration was performed in order to determine the $H_2O_2$ content. The concentration of $H_2SO_5$ could then be back calculated by subtracting the active oxygen content in the form of $H_2O_2$ from the total active oxygen content.

The results of Examples 4–6 are listed in table 2.

According to prior art U.S. Pat. No. 3,939,072, leaving the molar ratio of $H_2SO_4:H_2O_2$ unchanged (2:1) and the temperature within the range of 0° C.–80° C., no change in yield should be expected. The trials as described above, however, teach that the yield of $H_2SO_5$ was also dependent on the number of $H_2O_2$ additions. Unexpectedly, the yield could be increased from 70.1% (with the prior art process) to 81.6% using the process and equipment as described in the present invention. An approximate yield of 84% would be expected from dividing the $H_2O_2$ into four equal portions.

The peroxide can also be divided into unequal portions. For example, in three stages the total peroxide could be divided into 1/6, 1/6, and ⅔ portions or ¼, ¼ and ½ portions; in three stages the total peroxide could be divided into ⅓ and ⅔ portions or ¼ and ¾ portions. There are numerous possibilities so long as 100% of the peroxide is not added in one portion. It is preferred that the portion(s) added last be larger than the portions added first (e.g., 1/6, 1/6, and ⅔).

Further modifications and variations will be apparent to those skilled in the art from the foregoing and are intended to be encompassed by the appended claims.

TABLE 1

Preparation of Peroxymonosulfuric acid with various reactor types using $H_2SO_4$ (96% w/w) and $H_2O_2$ (70%)

| Reactor type Chemicals in gram | Conventional Process Single stage | | Multi-stage Process | | | |
|---|---|---|---|---|---|---|
| | | | Double-stage | | Triple-stage | |
| | added | present | added | present | added | present |
| $H_2O_2$ (100%) | 34.0 | — | 17.0 | — | 11.3 | — |
| $H_2SO_4$ (100%) | 196.2 | — | 196.2 | — | 196.2 | — |
| $H_2O$ | 22.7 | — | 15.5 | — | 13.0 | — |
| *Molar Ratio 1st Stage | 1:2:1.26:0 Mixing | | 1:4:1.72:0 Mixing | | 1:6:2.18:0 Mixing | |
| $H_2O_2$ (100%) | — | 6.8 | — | 1.4 | — | 0.7 |
| $H_2SO_4$ (100%) | — | 117.7 | — | 151.1 | — | 165.5 |
| $H_2O$ | — | 37.0 | — | 23.8 | — | 18.6 |
| $H_2SO_5$ (100%) | — | 91.4 | — | 52.4 | — | 35.7 |
| Stage AO yield, % | 80.0 | | 91.8 | | 94.2 | |
| $H_2O_2$ (100%) | — | — | 17.0 | — | 11.3 | — |
| $H_2O$ | — | — | 7.2 | — | 4.8 | — |
| *Molar Ratio 2nd Stage | — | — | 1:2.85:3.18:0.85 Mixing | | 1:4.78:3.68:0.88 Mixing | |
| $H_2O_2$ (100%) | — | — | — | 3.2 | — | 1.3 |
| $H_2SO_4$ (100%) | — | — | — | 107.3 | — | 134.5 |
| $H_2O$ | — | — | — | 38.9 | — | 29.1 |
| $H_2SO_5$ (100%) | — | — | — | 103.3 | — | 71.7 |
| Stage AO yield, % | — | | 82.5 | | 89.5 | |
| $H_2O_2$ (100%) | — | — | — | — | 11.4 | — |
| $H_2O$ (100%) | — | — | — | — | 4.9 | — |
| *Molar Ratio 3rd Stage | — | | — | | 1:3.67:5.04:1.68 Mixing | |
| $H_2O_2$ (100%) | — | — | — | — | — | 2.1 |
| $H_2SO_4$ (100%) | — | — | — | — | — | 103.9 |
| $H_2O$ | — | — | — | — | — | 39.6 |
| $H_2SO_5$ (100%) | — | — | — | — | — | 107.3 |
| Stage AO yield, % | — | | — | | 83.4 | |
| Total Yield, % | 80.0 | | 90.6 | | 93.9 | |

*Molar Ratio = $H_2O_2:H_2SO_4:H_2O:H_2SO_5$

TABLE 2

| Example | $H_2SO_4:H_2O_2$ Molar Ratio | Addition Points | AO Loss (%) | $H_2SO_5$ Temp. (°C.) | Yield $H_2SO_5$ |
|---|---|---|---|---|---|
| 4 | 2:1 | 1 | 20.2 | 15.0 | 70.1 |
| 5 | 2:1 | 2 | 10.5 | 21.0 | 75.4 |

TABLE 2-continued

| Example | $H_2SO_4:H_2O_2$ Molar Ratio | Addition Points | AO Loss (%) | $H_2SO_5$ Temp. (°C.) | Yield $H_2SO_5$ |
|---|---|---|---|---|---|
| 6 | 2:1 | 3 | 1.4 | 13.7 | 81.6 |

What is claimed:

1. A process for the production of a peroxyacid solution comprising treating a concentrated oxyacid sequentially with portions of concentrated hydrogen peroxide in at least 2 reaction stages, while maintaining the temperature of said treatment below about 100° C., said reaction stages comprising adding to the total amount of said oxyacid a portion of the total amount of hydrogen peroxide to be added for said treatment and mixing said portion with said oxyacid.

2. The process according to claim 1, wherein said portions of hydrogen peroxide are equal in weight.

3. The process according to claim 1, wherein at least one of said portions of hydrogen peroxide is unequal in amount from the remainder of said portions of hydrogen peroxide.

4. The process according to claim 1, wherein the last of said portions of hydrogen peroxide added to said oxyacid is larger than the remainder of said portions of hydrogen peroxide.

5. The process according to claim 1, wherein the process is carried out in a continuous manner, said reaction stages being arranged in series.

6. The process according to claim 5, wherein two to four reaction stages are employed.

7. The process according to claim 1, wherein at least one reaction stage combines mixing with cooling.

8. The process according to claim 1, wherein an exchanger of heat takes in at least one reaction stage.

9. The process according to claim 1, wherein said concentrated hydrogen peroxide is precooled to a temperature of about −40° C. to about 25° C.

10. The process according to claim 1 wherein said concentrated hydrogen peroxide is 50% to 80% strength weight by weight.

11. The process according to claim 10, wherein said concentrated hydrogen peroxide is 60% to 75% strength weight by weight.

12. The process according to claim 1, wherein said concentrated oxyacid is concentrated sulfuric acid.

13. The process according to claim 12, wherein said concentrated sulfuric acid is 96–100% strength by weight.

14. The process according to claim 12, wherein said concentrated sulfuric acid is at a temperature of from about 15° C. to about 40° C.

15. The process according to claim 1 wherein said temperature is in the range from about 0° to 80° C.

16. The process according to claim 1, wherein said mixing comprises utilizing at least one ejector/mixer.

17. The process according to claim 12, wherein said peroxyacid is peroxomonosulfuric acid.

18. A process for the production of a peroxyacid solution in higher yield and with reduced salt load in the effluent comprising treating a concentrated oxyacid sequentially with portions of concentrated hydrogen peroxide in at least 2 reaction stages, while maintaining the temperature of said treatment below about 100° C., said reaction stages comprising a first stage of adding only to the total amount of said oxyacid only a portion of the total amount of hydrogen peroxide to be added for said treatment and mixing said portion with said oxyacid to form a reaction mixture and a second stage of adding only a further portion of said total amount of hydrogen peroxide only to said reaction mixture, said portions consisting only of hydrogen peroxide.

19. The process according to claim 18, further comprising a third stage of adding only a further portion of said total amount of hydrogen peroxide to the product of said second stage.

20. The process according to claim 19, wherein said second stage is cooled before said third stage.

* * * * *

UNITED STATES PATENT AND TRADEMARK OFFICE
CERTIFICATE OF CORRECTION

PATENT NO.  : 5,141,731
DATED       : August 25, 1992
INVENTOR(S) : MEIER et al.

It is certified that error appears in the above-identified patent and that said Letters Patent is hereby corrected as shown below:

On the title page:

[73]    Assignee
    .... delete "DEGUSSA AKTIENGESELLSCHAFT, Frankfurt am Main, Federal Republic of Germany" and substitute therefor --DEGUSSA CORPORATION, Ridgefield Park, New Jersey--

Signed and Sealed this

Eighteenth Day of January, 1994

Attest:

BRUCE LEHMAN

Attesting Officer    Commissioner of Patents and Trademarks